United States Patent
Sigg et al.

(10) Patent No.: US 8,874,123 B1
(45) Date of Patent: Oct. 28, 2014

(54) DYNAMIC WIRELESS COVERAGE AREA CAPACITY ALLOCATION BASED ON VEHICULAR TRAFFIC MONITORING

(75) Inventors: Jason P. Sigg, Overland Park, KS (US); Maulik K. Shah, Overland Park, KS (US); Jasinder P. Singh, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 888 days.

(21) Appl. No.: 13/052,299

(22) Filed: Mar. 21, 2011

(51) Int. Cl.
*H04W 72/00* (2009.01)

(52) U.S. Cl.
USPC ........................... 455/452.1; 455/450

(58) Field of Classification Search
USPC ..................... 455/450, 452.1, 453
See application file for complete search history.

(56) References Cited

U.S. PATENT DOCUMENTS

| 6,628,637 B1 | 9/2003 | Li et al. |
| 7,206,588 B2 * | 4/2007 | Moriguchi et al. ........ 455/456.1 |

* cited by examiner

*Primary Examiner* — Joel Ajayi

(57) ABSTRACT

Described herein is a method and corresponding radio access network (RAN) arranged to dynamically control, based on vehicular traffic monitoring data, allocations of network capacity in a wireless coverage area. More particularly, according to the method the RAN may receive vehicular traffic monitoring data, perhaps from a service provider such as a vehicular traffic monitoring agency. Based on the received vehicular traffic monitoring data, the RAN may adjust a limit on extent of capacity allocated to new call originations and/or a limit on extent of capacity allocated to handoffs in a wireless coverage area of the RAN. According to one aspect of the method, the RAN may adjust network capacity allocations in the wireless coverage area based on a specified vehicular traffic speed. According to another aspect of the method, the RAN may adjust network capacity allocations in the wireless coverage area based on a specified vehicular traffic obstruction.

22 Claims, 6 Drawing Sheets

DYNAMIC WIRELESS COVERAGE AREA CAPACITY ALLOCATION BASED ON VEHICULAR TRAFFIC MONITORING

BACKGROUND

Many people use mobile devices, such as cell phones and personal digital assistants, to wirelessly communicate with wireless-communication networks. Mobile devices typically conduct these wireless communications by way of one or more radio access networks (RANs).

In a typical RAN, an area is divided geographically into a number of wireless coverage areas, such as cells and sectors, each defined by a radio frequency (RF) radiation pattern from a respective serving base transceiver station (BTS). Within each wireless coverage area, the serving BTS may provide one or more wireless links over which mobile devices may communicate with the RAN. In turn, the RAN may provide mobile devices with connectivity to the public switched telephone network (PSTN), one or more packet-data networks such as the Internet, and/or other transport networks. Thus, a mobile device may engage in various communication sessions via the RAN including, for example, voice communication sessions and/or packet-data communication sessions. A particular communication session that a mobile device engages in may be referred to as a "call," whether the communication session is a voice communication session, a packet-data communication session, or another type of communication session.

A mobile device may initiate a call within a first wireless coverage area by, for example, placing or receiving the call in the first wireless coverage area. If the mobile device then leaves the first wireless coverage area and enters a second wireless coverage area, the call may be handed off to the second wireless coverage area. In this way, the mobile device may continue the call when moving from the first wireless coverage area to the second wireless coverage area. Thus, a given call that is being carried out within a particular wireless coverage area may have been a new call origination within the wireless coverage area, or may have been a handoff into the wireless coverage area.

A BTS will have a limited amount of resources available for handling calls within its wireless coverage area. Such resources may include, for example, forward-link transmission power, Walsh codes that uniquely define communication channels, and/or other channel elements such as hardware and/or software components that are configured to perform encoding, modulation, and/or other operations to facilitate the transmission of data. Other examples of the resources that are required for handling calls may exist as well, and the particular resources employed by a given BTS may vary depending on the particular communication protocol used by the BTS. Generally, the resources available for handling calls within a wireless coverage area of a BTS may be referred to as the capacity of the wireless coverage area. Thus, a given wireless coverage area will have a limited total capacity available for handling calls.

Each new call origination and each handoff into a wireless coverage area will require a certain amount of the total capacity of the wireless coverage area. Accordingly, a first portion of the total capacity may be set aside to support new call originations, and a second portion of the total capacity may be set aside to support handoffs. In other words, the RAN may impose a limit on extent of the capacity allocated to new call originations in the wireless coverage area, and the RAN may also impose a limit on extent of capacity allocated to handoffs into the wireless coverage area.

When the limit on extent of capacity allocated to new call originations in the wireless coverage area has been met or exceeded, a mobile device that requests a new call origination within the wireless coverage area may be denied service in the wireless coverage area. Similarly, when the limit on extent of capacity allocated to handoffs into the wireless coverage area has been met or exceeded, a mobile device that requests handoff into the wireless coverage area may be denied service in the wireless coverage area.

Such denials of service may negatively impact the quality of a mobile device user's experience with a given RAN. Therefore, it is generally desirable to control allocations of network capacity so as to help minimize the occurrence of denials of service.

OVERVIEW

One such way to control allocation of capacity in a wireless coverage area generally involves adjusting the allocation based on the requests for service received by the RAN. For instance, if there is an atypically large quantity of new call originations in a wireless coverage area, the RAN may, if necessary, reactively increase the limit on extent of capacity allocated to new call originations in an attempt to avoid denying service to a large number of new call origination requests. One shortcoming of this approach is that the RAN may not be able to adjust the capacity allocation until it is too late. That is, in the event that there is an atypically large quantity of new call originations in the wireless coverage area, for example a quantity of new call originations that meets or exceeds the limit on extent of capacity allocated to new call originations, the RAN may deny an undesirably large number of new call origination requests before the limit on extent of capacity allocated to new call originations is increased.

Another way to control allocation of capacity generally involves adjusting the allocation based on historical network conditions. For instance, at a given time of day, the RAN may allocate capacity according to historical averages of network conditions, such as historical averages of requests for service, at that time of day. One shortcoming of this method is that the evaluation of historical network conditions may generally require the evaluation of large amounts of data and therefore may be computationally intensive. To reduce the amount of data analyzed, the RAN may analyze only certain samples of the historical data. However such an approach may result in inaccurate approximations of desirable network capacity allocations. Another shortcoming of this method is that evaluation of historical information cannot account for unsystematic events that may impact network conditions.

Disclosed herein is a potentially more effective method for controlling allocation of capacity in a wireless coverage area. According to the method, a RAN may dynamically control the allocation of capacity based on vehicular traffic monitoring data. More particularly, the RAN may receive vehicular monitoring data, perhaps from a service provider such as a vehicular traffic monitoring agency, and based on the received vehicular traffic monitoring data, the RAN may adjust a limit on extent of capacity allocated to new call originations in the wireless coverage area. Additionally, or alternatively, the RAN may adjust a limit on extent of capacity allocated to new handoffs into the wireless coverage area.

The source of vehicular traffic monitoring data may be, for example, road-side camera monitors, in-road sensors, and/or human reports of vehicular traffic conditions along various vehicular traffic routes of interest. Other examples of vehicular traffic monitoring sources certainly exist as well.

Therefore, generally, the vehicular traffic monitoring data may specify real-time vehicular traffic conditions within and/or outside of the wireless coverage area, perhaps along a particular vehicular traffic route that extends through the wireless coverage area. In this way, the RAN may control capacity allocations so as to effectively handle variations in network conditions (e.g., atypical amounts of new call origination and/or handoff requests) that may arise as a result of varying vehicular traffic flows into and out of the wireless coverage area. That is the RAN may proactively and accurately adjust network capacity allocations based on vehicular traffic, as opposed to reactively adjusting network capacity allocations based on observed and/or historical network conditions.

The RAN may be arranged to allocate capacity in various ways in response to the vehicular traffic monitoring data received. For example, the RAN may be configured to associate certain vehicular traffic conditions with certain allocations of network capacity. Upon receiving vehicular traffic monitoring data that specifies a particular vehicular traffic condition, the RAN may adjust the allocation of network capacity to be an allocation that corresponds to the specified vehicular traffic condition.

More particularly, in accordance with the present disclosure, the RAN may adjust allocations of network capacity based on a vehicular traffic speed along a vehicular route of interest. For example, the RAN may increase a limit on extent of the capacity allocated to new call originations in response to making a determination that the specified vehicular traffic speed is below a speed threshold. Correspondingly, the RAN may also decrease a limit on extent of capacity allocated to handoffs in response to making a determination that the specified vehicular traffic speed is below a speed threshold.

Alternatively, the RAN may decrease a limit on extent of the capacity allocated to new call originations in response to making a determination that the specified vehicular traffic speed is above a speed threshold. Correspondingly, the RAN may also increase a limit on extent of capacity allocated to handoffs in response to making a determination that the specified vehicular traffic speed is above a speed threshold.

Further in accordance with the present disclosure, the RAN may adjust allocations of capacity based on a vehicular traffic obstruction, such as a vehicle crash or other obstruction, along a vehicular traffic route of interest. For example, the RAN may be configured to associate certain vehicular traffic obstructions with certain allocations of network capacity. Thus, upon receiving vehicular traffic monitoring data that specifies a particular vehicular traffic obstruction, the RAN may adjust the allocation of network capacity to be equal to an allocation that is associated with the specified vehicular traffic obstruction. Such an adjustment may involve increasing or decreasing at least one of the limit on extent of the capacity allocated to new call originations and the limit on extent of capacity allocated to handoffs.

These as well as other aspects and advantages will become apparent to those of ordinary skill in the art by reading the following detailed description, with reference where appropriate to the accompanying drawings.

DETAILED DESCRIPTION

In this description, a "RAN" is referred to as the wireless network infrastructure that provides wireless coverage areas in which mobile devices can operate. Such a RAN may include multiple base transceiver stations (BTSs) having antenna arrangements and associated equipment that radiate to define the wireless coverage areas at issue. Herein, aspects of the present method are described as being carried out by a RAN. However, aspects of the present method can be implemented by a single RAN component, such as a BTS or a base station controller (BSC), or by a combination of RAN components, such as a BTS in combination with a BSC and/or another RAN component.

More generally, it should be understood that the present description is set forth by way of example only and that numerous variations are possible. As such, those skilled in the art will appreciate that other arrangements and elements (e.g., machines, interfaces, functions, orders of functions, and groupings) can be used instead, and that some elements may be omitted altogether. Further, many of the elements described herein are functional entities that may be implemented as discrete or distributed components or in conjunction with other components, and in any suitable combination and location. Moreover, various functions described herein as being performed by one or more entities may be carried out by hardware, firmware and/or software. For instance, various functions may be carried out by a processor executing instructions stored in memory.

Figure 1:
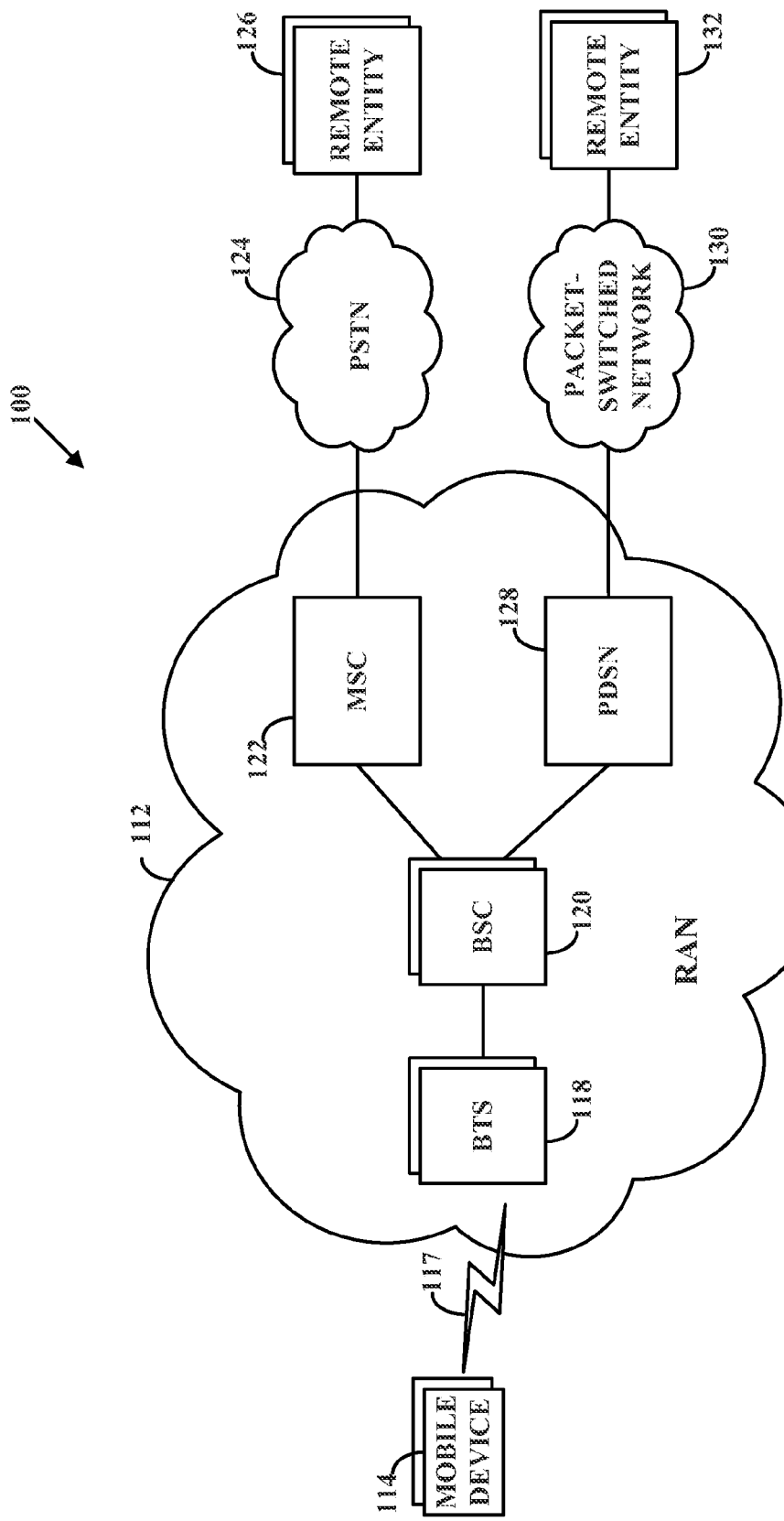
FIG. 1 is a simplified block diagram of an example communication system in which the present method can be implemented.

Referring to the drawings, FIG. 1 is a simplified block diagram of a communication system in which an example embodiment of the present method can be implemented. As shown in FIG. 1, example communication system 100 includes a radio access network (RAN) 112, which provides connectivity between one or more mobile devices and one or more transport networks. RAN 112 includes one or more BTSs 118 that radiate to produce an air interface 117 throughout a wireless coverage area in which mobile devices can operate. Mobile devices and RAN 112 may generally communicate over air interface 117 according to one or more air interface protocols, such as CDMA, WiMAX, LTE, IDEN, GSM, WIFI, HDSPA, or other protocols now known or later developed.

FIG. 1 depicts mobile device 114, which is positioned in a wireless coverage area of RAN 112. Note that mobile device 114 could be a cell phone, a wirelessly equipped PDA, a wirelessly equipped computer or laptop computer, a hybrid mobile device, a multi-mode Wi-Fi/cellular device, or any other type of wirelessly-equipped device now known or later developed. Mobile device 114 may generally be equipped with hardware, software, and/or other logic to communicate with RAN 112 over air interface 117 in a known manner in accordance with the agreed air interface protocol.

BTS 118 may be any one or any combination of network elements arranged to carry out the BTS functions described herein. As such, BTS 118 may include a communication interface, a processor, and data storage comprising instructions executable by the processor to carry out those functions. The communication interface may include one or more antennas and chipsets or other components for providing one or more wireless coverage areas, such as that of air interface 117, for communicating with mobile devices, such as mobile device 114. The communication interface may also include a wired packet-data interface such as an Ethernet interface for communicating directly, or over one or more networks, with BSC 120, MSC 122, and/or PDSN 128.

BTS 118 is coupled with base station controller (BSC) 120, which is then coupled with mobile switching center (MSC) 122 and packet data serving node (PDSN) 128. BSC 120 may be any one or any combination of network elements arranged to carry out the BSC functions described herein. As such, BSC 120 may include a communication interface, a processor, and data storage comprising instructions executable by the processor to carry out those functions. The communication interface may include one or more wired and/or wireless interfaces for communicating with at least BTS 118, MSC 122, and PDSN 128.

MSC 122 may be any networking element arranged to carry out the MSC functions described herein. As such, MSC 122 may include a communication interface, a processor, and data storage comprising instructions executable by the processor to carry out those MSC functions. The communication interface may include one or more wired and/or wireless interfaces for communicating with at least BSC 120 and PSTN 128. In general, MSC 108 functions as a switching element between PSTN 124 and one or more BSCs such as BSC 120, facilitating communication between mobile devices and PSTN 124, which may be the well-known public switched telephone network. With this arrangement, mobile device 114 may communicate with remote entity 126 through a communication path comprising air interface 117, BTS 118, BSC 120, MSC 122, and PSTN 124. Remote entity 126 may be, for example, a remote telephone device.

PDSN 128 may be any networking element arranged to carry out the PDSN functions described herein. As such, PDSN 128 may include a communication interface, a processor, and data storage comprising instructions executable by the processor for carrying out those PDSN functions. The communication interface may include one or more wired and/or wireless interfaces for communicating with at least BSC 120 and packet-switched network 130. In general, packet-switched network 130 functions as a network access server between packet-switched network 130 and one or more BSCs such as BSC 120, facilitating packet-data communication between mobile devices and packet-switched network 130. With this arrangement mobile device 114 may communicate with remote entity 132 through a communication path comprising air interface 117, BTS 118, BSC 120, PDSN 128, and packet-switched network 130. Remote entity 132 may be, for example, a remote computer.

Note that many variations on example communication system 100 are possible. For example, although FIG. 1 explicitly shows only one BTS, one BSC, one MSC and one PDSN, communication system 100 could include multiples of these entities. That is, an MSC and/or PDSN could serve one or more BSCs, each BSC could serve one or more BTSs, and each BTS could radiate to provide one or more air interfaces in one or more respective coverage areas. As another example, the functional components of RAN 112 could be combined together in various ways. For instance, BTS 118 and BSC 120 could be combined together, and/or BSC 120 and MSC 122 could be combined together. As still another example, one or more of the functional components could be omitted altogether.

Thus, various components of RAN 112, including but not limited to BTS 118 and BSC 120, can work alone or in combination to carry out the functions of the present method, including those functions described below with respect to FIGS. 4A and 4B. Which components are involved may depend on the particular network arrangement and air interface protocol used. As noted above, for instance, aspects of the method can be carried out by BTS 118, BSC 120, MSC 122, PDSN 128, or one or more other RAN components.

Figure 2:
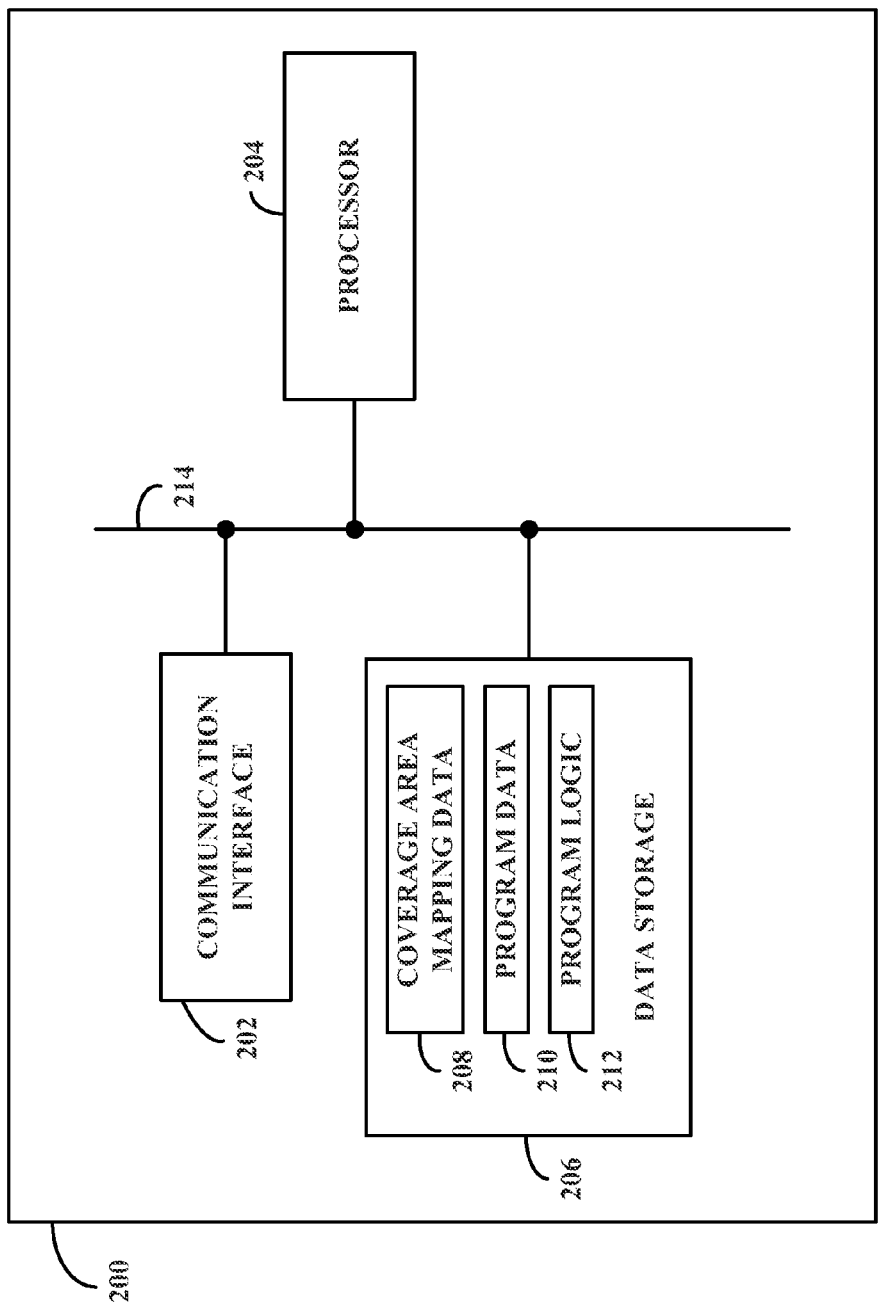
FIG. 2 is a simplified block diagram of an example radio access network arranged to implement aspects of at least one embodiment of the method.

Accordingly, FIG. 2 is a simplified block diagram depicting functional components of an example RAN 200 arranged to implement aspects of at least one embodiment of the present method. Such functional components may be the same, different, or a combination of the functional components described above with respect to BTS 118, BSC 120, MSC 122, PDSN 128. Generally, the functional components shown in FIG. 2 are functional components that may be involved in carrying out the RAN functions described herein. However, it should be understood that example RAN 200 may include additional and/or alternative functional components as well. Further, although FIG. 2 depicts components as discrete boxes, it should be understood that the components can be integrated together or distributed to any extent desired, and that other variations are possible.

As shown, RAN 200 includes communication interface 202, processor 204, and data storage 206, all of which may be communicatively linked together by a system bus or other connection mechanism 214. Communication interface 202 may include one or more channel elements, power amplifiers, and antenna arrangements, cooperatively working to define and manage one or more wireless coverage areas in which RAN 200 can provide service to mobile devices. Thus, in various embodiments of the present method, communication interface 202 may be one of, or a combination of, the communication interfaces described above with respect to BTS 118, MSC 120, MSC 122, and/or PDSN 128.

Processor 204 comprises one or more general purpose processors and/or one or more special purpose processors (e.g., digital signal processors, application specific integrated circuits, etc.). Data storage 206, in turn, comprises one or more volatile and/or non-volatile storage components, such as magnetic, optical, or organic memory components. As shown, data storage 206 may include coverage area mapping data 208, program data 210, and program logic 210 executable by processor 204 to carry out various RAN functions. Although these components are described herein as separate data storage elements, the elements could just as well be physically integrated together or distributed in various other ways. For example, program data 210 may be maintained in data storage 206 separate from the program logic 212, for easy updating and reference by program logic 212.

Coverage area mapping data 208 may designate various wireless coverage areas of RAN 200 and may specify various data regarding the geographic location and geographic scope of each wireless coverage area. For instance, the data may specify for each wireless coverage area a geographic location of the wireless coverage area, such as a location of the BTS that radiates to define the wireless coverage area, a likely geographic scope of the wireless coverage area, and other data regarding the wireless coverage area. This data may be established through field testing or other means. In accordance with the method, coverage area mapping data 208 may also include information regarding various vehicular traffic routes that may, or may not, extend into the various wireless coverage areas of RAN 200.

Program data 210 may include various other data used by RAN 200 in operation. As an example, program data 210 may store network capacity allocation data that correlates particular vehicular traffic conditions with particular network capacity allocations. As an example, program data 210 may include a data table that correlates vehicular traffic speeds at particular geographic locations with network capacity allocations. As another example, program data 210 may include a data table that correlates vehicular traffic obstructions at particular geographic locations with network capacity allocations. As another example still, program data 210 may include threshold data that specifies various vehicular traffic speed thresholds that may be used, by comparison with received vehicular traffic monitoring data, to determine that an adjustment of network capacity allocation is desired. Other examples of program data are possible as well.

Any such data may be stored by RAN 200 together in the same data table in program data 210. Alternatively, such data may be stored separately in separate data tables in program data 210. Of course, many other examples and ways of organizing network capacity allocation data are possible as well. Both coverage area mapping data 208 and program data 210 are discussed further below.

As noted above, a mobile device may initiate a call within a first wireless coverage area by, for example, placing or receiving the call in the wireless coverage area. Returning to FIG. 1, to place a call (e.g., a voice call, a data session, or some other communication session), mobile device 114 may transmit a new call origination request message to BTS 118, and BTS 118 may pass the request along to BSC 120. BSC 120 may then direct BTS 118 to assign an air interface traffic channel to mobile device 114 for use for the call. Further, BSC 120 may work with MSC 122 or PDSN 128 to establish a network connection for the call and may then allow the call to proceed.

Similarly, when RAN 112 seeks to connect a call or otherwise establish communication with mobile device 114, RAN 112 may transmit a page message to mobile device 114, and mobile device 114 may then send a page response to RAN 112. Upon receipt of the response from mobile device 114, RAN 112 may then proceed in the manner described above to assign a traffic channel and establish the new call connection.

As also noted above, a call may be handed off from one wireless coverage area to another wireless coverage area. To facilitate such handoffs, among other things, a RAN will typically broadcast a pilot signal respectively in each wireless coverage area that it serves, which may enable mobile devices engaged in calls within a given wireless coverage area to detect and evaluate the quality of various wireless coverage areas provided by the RAN. Thus, when a mobile device is engaged in a call within a given wireless coverage area, the mobile device may regularly monitor the strength (e.g., signal to noise ratio) of the pilot signal in that wireless coverage area as well as the strengths of the pilot signals in adjacent wireless coverage areas. If the pilot signal from an adjacent wireless coverage area becomes sufficiently stronger than the pilot signal from the current serving wireless coverage area (e.g., as a result of the mobile device moving toward the adjacent wireless coverage area), the mobile device may then engage in communications with the RAN to request a handoff of the call from the serving wireless coverage area to the adjacent wireless coverage area. As discussed below, FIGS. 3A and 3B depict, among other things, adjacent wireless coverage areas between which handoffs may occur.

Figure 3A:
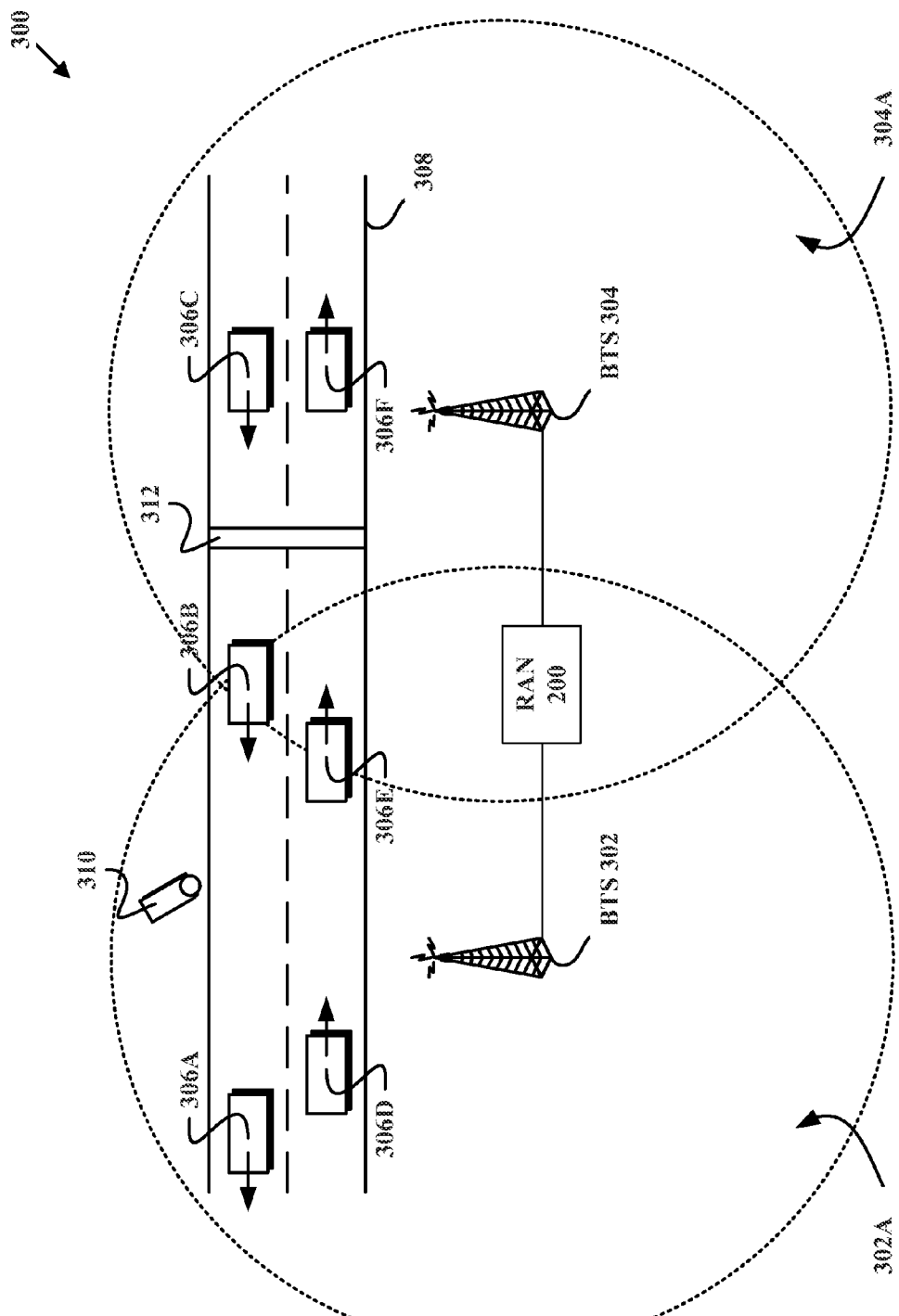
FIGS. 3A and 3B are illustrations of vehicular traffic in example wireless coverage areas, in accordance with at least one embodiment of the method.
Figure 3B:
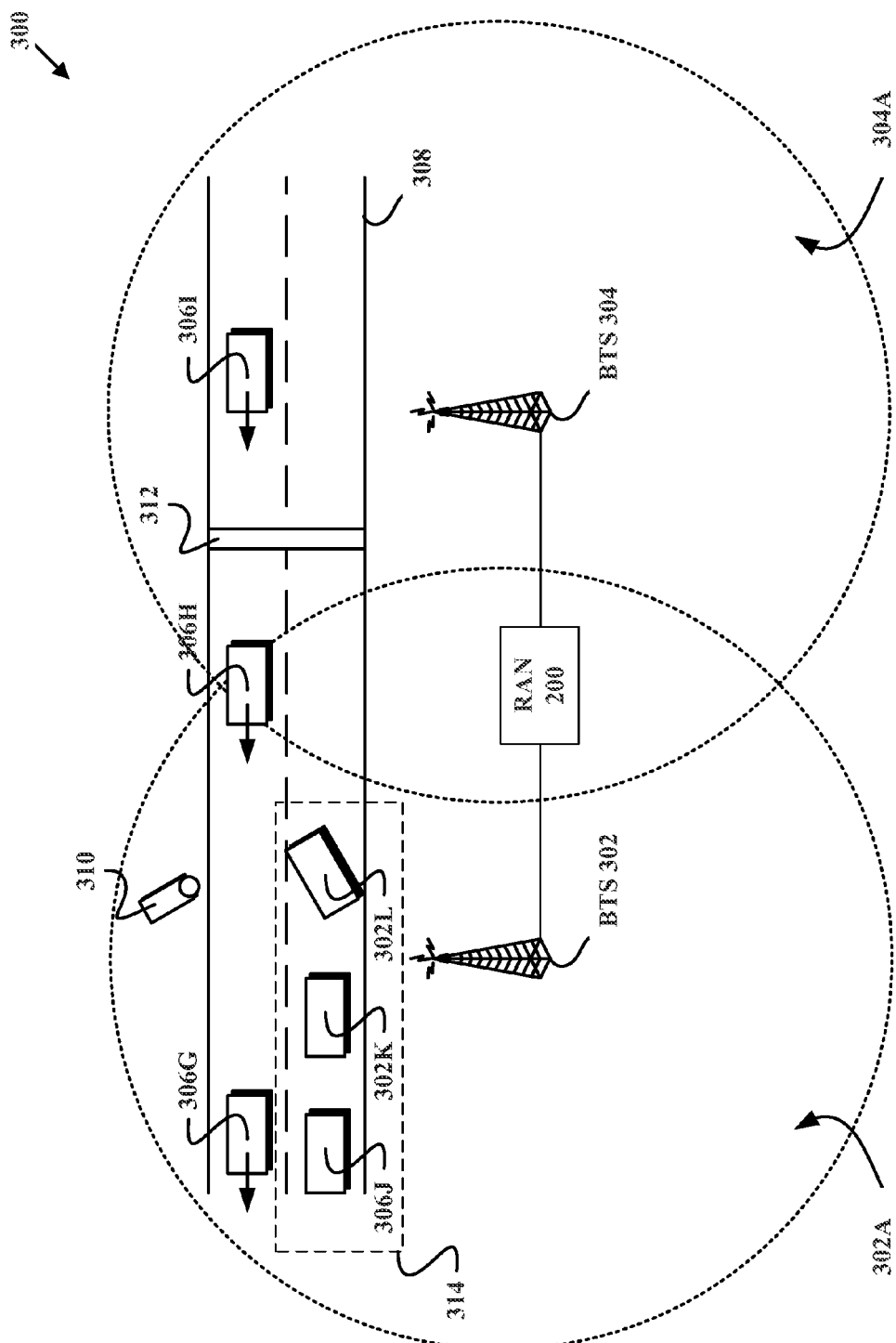

FIGS. 3A and 3B are simplified block diagrams of vehicular traffic in example wireless coverage areas, in accordance with at least one embodiment of the method. FIGS. 3A and 3B generally depict a geographic region having adjacent wireless coverage areas, such as wireless coverage area 302A and wireless coverage area 304A. Wireless coverage area 302A and wireless coverage area 304A are shown as being served by BTS 302 and BTS 304, respectively. Note that although wireless coverage areas 302A and 304A are shown as being served by separate BTSs, wireless coverage areas 302A and 304A may alternatively be served by the same BTS. Further, BTSs 302 and 304 may be part of the same RAN, such as RAN 200 as depicted in FIGS. 3A and 3B.

In FIGS. 3A and 3B, wireless coverage areas 302A and 304A are represented by circles that denote the core or origin of each wireless coverage area, such as BTS 302 and 304, respectively. In practice, the actual scope of wireless coverage for each coverage area may be greater or less than that shown, depending, for example, on the power of the BTS transmission and the extent of air interface interference. Thus, although the circles are shown as having the same size, it is possible that some coverage areas may have greater or lesser geographic scope than others.

FIGS. 3A and 3B also depict various additional entities within wireless coverage areas 302A and 304A. With reference to FIG. 3A, various vehicles 306A-306F are shown as part of vehicular traffic along route 308, which extends through both wireless coverage area 302A and wireless coverage area 304A. Note that vehicles 306A-306C are shown as moving from right to left in FIG. 3A, or, generally, from wireless coverage area 304A to wireless coverage area 302A along route 308. On the other hand, vehicles 306D-306F are shown as moving from left to right in FIG. 3A, or, generally, from wireless coverage area 302A to wireless coverage area 304A along route 308.

FIG. 3A also depicts various vehicular traffic monitoring sources including vehicular traffic monitoring camera 310 and in-road vehicular traffic monitoring sensor 312. Camera 310 may include any combination of hardware and/or software, including a processor, data storage, a communication interface, and/or program logic, that is necessary to carry out the camera functions described herein. Camera 310 may, for example, be arranged to monitor, perhaps via video capture techniques, vehicular traffic along route 308 and may be arranged to transmit vehicular traffic monitoring data that specifies vehicular traffic conditions along route 308. Camera 310 may be, for instance, one of a number of similar vehicular traffic monitoring cameras that are arranged to provide vehicular traffic monitoring data to a traffic monitoring agency. Such a vehicular traffic monitoring agency may collect vehicular traffic monitoring data transmitted by camera 310 and make it available, perhaps via network transmission, to other parties and/or entities including, for example, RAN 200.

Sensor 312 may also be arranged to monitor vehicular traffic along route 308 and may be arranged to transmit vehicular traffic monitoring data that specifies vehicular traffic conditions along route 308. Sensor 312 may include any combination of hardware and/or software, including a processor, data storage, a communication interface, and/or program logic, that is necessary to carry out the sensor functions described herein. Sensor 312 may be any suitable sensor and, in operation, may provide an indication that vehicles have passed over the sensor. Sensor 312 may be, for example, a pressure sensor. As with camera 310, the traffic monitoring data transmitted by sensor 312 may be collected by a vehicular traffic monitoring agency and made available, perhaps via network transmission, to other parties and/or entities.

Other examples of vehicular traffic monitoring sources and/or techniques are certainly possible as well. As one additional example, a human may observe traffic conditions along route 308, perhaps from a road-side monitoring station, or perhaps from a helicopter, and report the observed traffic conditions to a traffic monitoring agency.

As noted above, a traffic monitoring agency, after receiving vehicular traffic monitoring data, may make such vehicular traffic monitoring data available to other parties and/or entities. In doing so, the traffic monitoring agency may first process the traffic monitoring data in some fashion so as to provide it in a format that is desirable for use and/or analysis. For instance, the traffic monitoring agency may provide vehicular traffic monitoring data that specifies a vehicular traffic speed at a particular geographic location along route 308. Such a vehicular traffic speed may reflect, for example, a single measurement of vehicular speed along route 308, or an average of multiple measurements of vehicular speeds along route 308. Alternatively, or additionally, the traffic monitoring agency may provide traffic monitoring data that specifies a vehicular traffic obstruction at a particular geographic location along route 308. Such a vehicular traffic obstruction may be, for example, at least one of a vehicle crash, road-construction work, a weather condition such as inclement weather, or some other vehicular traffic obstruction.

Although the collection, processing, and provisioning of vehicular traffic monitoring data is described above as being carried out by a vehicular traffic monitoring agency, this is not necessary. A party and/or entity that is interested in such vehicular traffic monitoring data may obtain such data in some other manner such as, for example, by monitoring the vehicular traffic itself. As an example, a party that manages a given RAN, such as a wireless service provider, may deploy various vehicular traffic monitoring sources such as camera 310 and sensor 312, and such vehicular traffic monitoring sources may be arranged to transmit vehicular traffic monitoring data directly to the given RAN.

As vehicular traffic flows along route 308 to and from wireless coverage areas 302A and 304A, various passengers in vehicles 306A-306F may be engaged in, or may initiate, calls using mobile devices. Thus, the quantity of new call originations and handoffs in each of wireless coverage areas 302A and 304A at a given period of time may vary according to the flow of vehicular traffic along route 308. For instance, in the event that vehicular traffic is flowing at a rate that is typical of route 308, a typical number of new call originations and/or handoffs may be present in wireless coverage areas 302A and 304A. However, in the event that vehicular traffic flows at a rate that is not typical of route 308, perhaps significantly faster or significantly slower, then an atypical quantity of new call originations and/or handoffs in wireless coverage areas 302A and 304A may result.

As one example of a vehicular traffic flow that may not be typical of route 308, FIG. 3B depicts wireless coverage areas 302A and 304A as well as a vehicular traffic obstruction along route 308. More particularly, various vehicles 306G-306L are shown as part of vehicular traffic along route 308. While vehicles 306G-306I are shown as moving freely from wireless coverage area 304A to wireless coverage area 302A, vehicles 306J-306L are shown as stationary in wireless coverage area 302A. In this instance, it may be assumed that vehicle 306L has been involved in a vehicular crash, resulting in traffic jam 314. However, clearly, such a traffic jam might result from a variety of other causes including, but not limited to, rush hour traffic, road construction work, inclement weather, and/or one or more of many other potential vehicular traffic obstructions.

In any event, the flow of traffic along route 308 as depicted in FIG. 3B may be atypical. Thus, an atypical quantity of new call originations and/or handoffs in wireless coverage areas 302A and 304A may result. With respect to the particular situation depicted in FIG. 3B, as a consequence of traffic jam 314 within wireless coverage area 302A, wireless coverage area 302A may experience an atypically high number of new call originations, and may experience an atypically low number of handoffs. Further, as a result of traffic jam 314 within wireless coverage area 302A, wireless coverage area 304A may also experience an atypically low number of new call originations and handoffs.

As described above, each new call origination and each handoff in a wireless coverage area will require a certain amount of the total capacity of the wireless coverage area. Accordingly, a RAN may impose a limit on extent of the capacity allocated to new call originations in the wireless coverage area and the RAN may also impose a limit on extent of capacity allocated to handoffs into the wireless coverage area. In normal operation, a RAN may be configured to impose typical, or default, limits on extent of capacity allocated to new call originations and/or handoffs.

However, when the limit on extent of capacity allocated to new call originations in the wireless coverage area has been met or exceeded, a mobile device that requests a new call origination within the wireless coverage area may be denied service in the wireless coverage area. Similarly, when the limit on extent of capacity allocated to handoffs into the wireless coverage area has been met or exceeded, a mobile device that requests handoff into the wireless coverage area may be denied service in the wireless coverage area.

Thus, in atypical situations, such as the situation depicted in FIG. 3B, given that wireless coverage area 302A may experience an atypically high number of new call originations, the default limit on extent of capacity allocated to new call originations in wireless coverage area 302A may be met or exceeded, which may result in the denial of a high number of requests for new call originations. In such a situation, it may be desirable to increase the limit on extent of the capacity allocated to new call originations within wireless coverage area 302A. Correspondingly, given that wireless coverage area 302A may, at the same time, experience an atypically low number of requests for handoffs into wireless coverage area 302A, it may be desirable to decrease the limit on extent of capacity allocated to handoffs into wireless coverage area 302A.

Further, given that wireless coverage area 304A may experience an atypically low number of requests for both new call originations and handoffs into wireless coverage area 304A, it may also be desirable to increase the limit on extent of capacity allocated to handoffs into wireless coverage area 304A, and to correspondingly decrease the limit on extent of the capacity allocated to new call originations within wireless coverage area 304A. It may be desirable to increase the capacity allocated to handoffs in such a situation, as, all else being equal, denials of requests for handoffs are typically considered less desirable than denials of requests for new call originations.

Figure 4A:
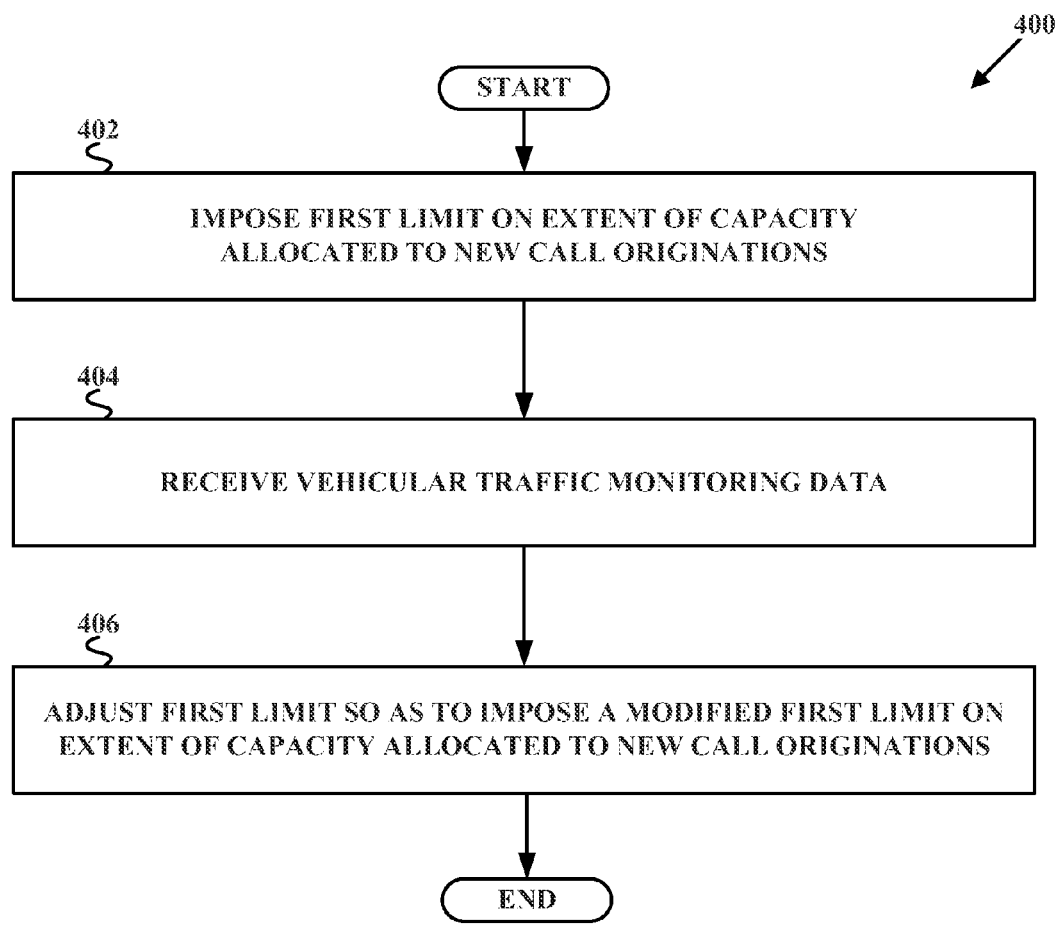
FIGS. 4A and 4B are each a flowchart depicting functions that can be carried out in accordance with at least one embodiment of the method.
Figure 4B:
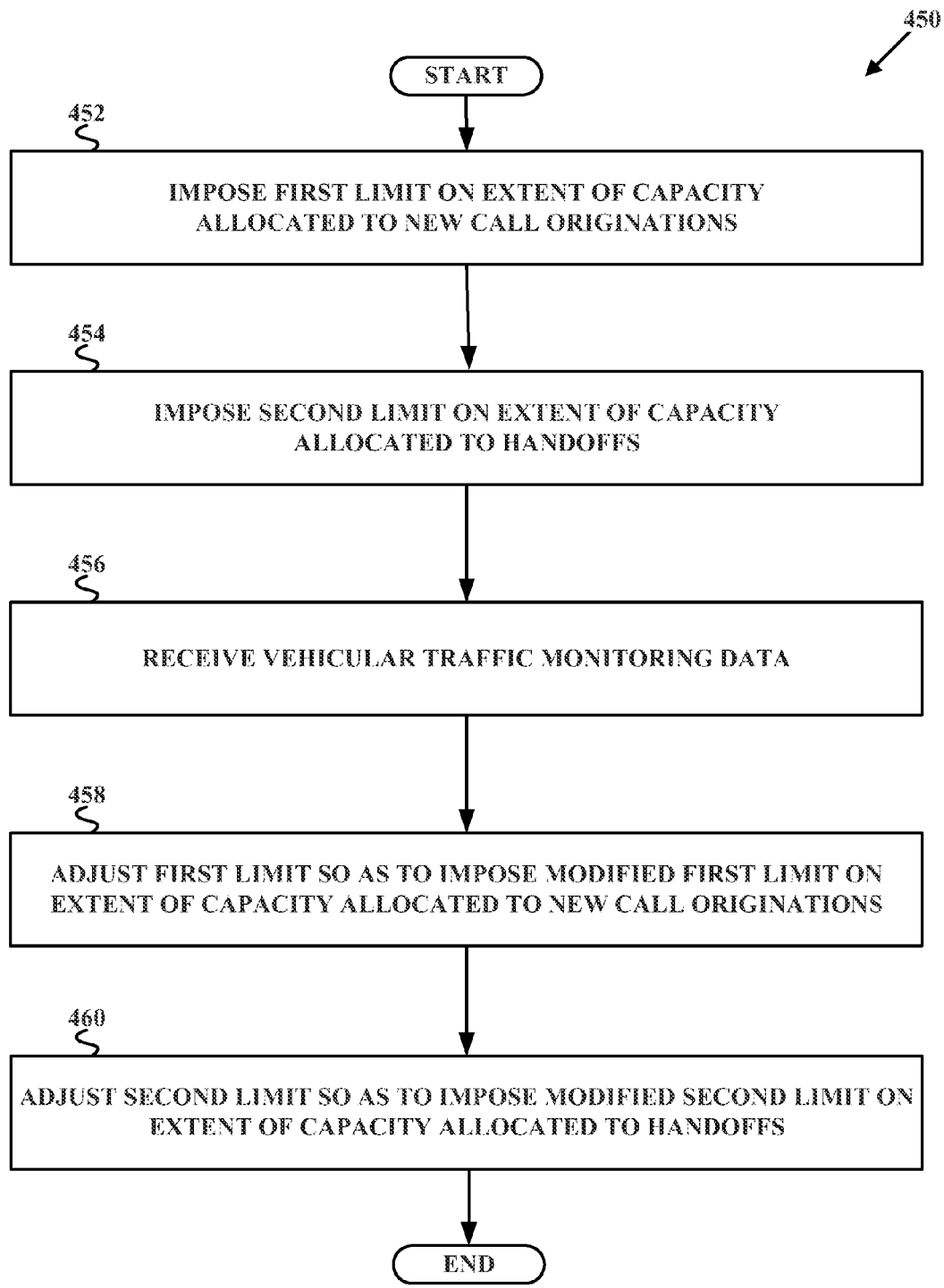

The functions depicted in FIGS. 4A and 4B may facilitate such adjustments in network capacity allocations. FIGS. 4A and 4B are each a flowchart depicting functions that can be carried out by RAN 200 to adjust network capacity allocations based on vehicular traffic monitoring data, in accordance with the present method. Generally, method 400 of FIG. 4A involves adjusting a limit on extent of capacity allocated to new call originations. Method 450 of FIG. 4B involves, in addition to adjusting a limit on extent of capacity allocated to new call originations, adjusting the limit on extent of capacity allocated to handoffs. Note, therefore, that the limits on extent of capacity allocated to new call originations and handoffs may be varied independently, or may be varied in combination, perhaps inversely.

Further note that although, in FIG. 4B, the limit on extent of capacity allocated to handoffs is described as being adjusted in combination with the limit on extent of capacity allocated to new call originations, the limit on extent of capacity allocated to handoffs may just as well be adjusted independently of, and/or without adjusting, the limit on extent of capacity allocated to new call originations. In the description of FIGS. 4A and 4B that follows below, for purposes of clarity, the limit on extent of capacity allocated to new call originations may be at times referred to as a first limit, and the limit on extent of capacity allocated to handoffs may be at times referred to as a second limit.

Also below, adjustments of network capacity allocation are described as being based on received vehicular traffic data. It should therefore be understood that RAN 200 may use a combination of coverage area mapping data 208, program data 210, and program logic 212 to determine, for the wireless coverage area, a network capacity allocation that corresponds to the vehicular traffic condition specified in received vehicular traffic monitoring data. RAN 200 may store data that correlates, or otherwise facilitates the association of, vehicular traffic conditions that are located either within, or outside of, the wireless coverage area with desirable network capacity allocations. Therefore, RAN 200 may be capable of adjusting network capacity allocations within a given wireless coverage area whether the specified vehicular traffic condition is geographically located within, or outside of, the given wireless coverage area Method 400 may be carried out by a RAN, such as RAN 200, that radiates to define a wireless coverage area having an amount of capacity. As shown in FIG. 4A, at step 402, RAN 200 may impose a first limit on extent of capacity allocated to new call originations in the wireless coverage area. At step 404, RAN 200 may receive vehicular traffic monitoring data. And at step 406, based on the received vehicular traffic monitoring data, RAN 200 may adjust the first limit, so as to then impose a modified first limit on extent of capacity allocated to new call originations in the wireless coverage area. These steps are further explained below.

At step 402, RAN 200 may impose a first limit on extent of capacity allocated to new call originations in the wireless coverage area. The first limit on extent of capacity allocated to new call originations in the wireless coverage area at step 402 may be, for example, a typical, or default, first limit. Alternatively, RAN 200 may have previously adjusted the limit on extent of capacity allocated to new call originations in the wireless coverage area, such that the first limit that RAN 200 imposes in accordance with step 402 is not a default limit.

At step 404, RAN 200 may receive vehicular traffic monitoring data. The vehicular traffic monitoring data may be received by RAN 200 in any manner described above. For example, RAN 200 may receive the vehicular traffic monitoring data from a vehicular traffic monitoring agency. Alternatively, RAN 200 may receive the vehicular monitoring data directly from vehicular monitoring sensors that have been deployed by the wireless service provider that manages RAN 200. Generally, the vehicular monitoring data may specify any vehicular traffic condition that is of interest to the RAN. More particularly, the vehicular traffic monitoring data may specify at least one of a vehicular traffic speed and a vehicular traffic obstruction at a particular geographic location. For example, with respect to FIG. 3B, the received vehicular monitoring traffic data may specify that a vehicular traffic speed along route 308 from wireless coverage area 302A to wireless coverage area 304A is very slow, perhaps an average of 3 miles per hour. Alternatively, the received vehicular monitoring traffic data may specify that there is a vehicular traffic obstruction, perhaps a "vehicular crash," in wireless coverage area 302A along route 308 from wireless coverage area 302A to wireless coverage area 304A.

At step 406, based on the received vehicular traffic monitoring data, RAN 200 may adjust the first limit, so as to then impose a modified first limit on extent of capacity allocated to new call originations in the wireless coverage area. In doing so, RAN 200 may generally use information contained in coverage area mapping data 208 and program data 210 to determine a desirable network capacity allocation based on the received vehicular traffic monitoring data.

In one embodiment of the method, in accordance with step 406, RAN 200 may make a determination that a specified vehicular traffic speed is below a speed threshold. Such a determination may be made using program logic 214, based on speed threshold data stored in program data 210. On the one hand, program data 210 may include various speed thresholds which if exceeded may result in RAN 200 decreasing the first limit on extent of capacity allocated to new call originations within the particular wireless coverage area. On the other hand, program data 210 may also include various other speed thresholds which if not exceeded may result in RAN 200 increasing the first limit on extent of capacity allocated to new call originations within the particular wireless coverage area.

For example, with respect to FIG. 3B if the vehicular traffic speed in wireless coverage area 302A is below a speed threshold such as 15 miles per hour, as is the case where the received vehicular traffic monitoring data specifies a vehicular traffic speed of 3 miles per hour, RAN 200 may proactively impose an increased first limit on extent of the capacity allocated to new call originations in wireless coverage areas 302A. However, if the specified vehicular speed is above a particular speed threshold (which may not necessarily be the same speed threshold of 15 miles per hour) RAN 200 may conversely impose a decreased first limit on extent of the capacity allocated to new call originations in the wireless coverage area.

In another embodiment of the method, the vehicular traffic monitoring data received by RAN 200 may specify a vehicular traffic obstruction, and RAN 200 may adjust the allocation of network capacity to be equal to an allocation that is associated with the specified vehicular traffic obstruction. More particularly, RAN 200 may select, based on the specified vehicular traffic obstruction, a predetermined first limit on extent of capacity allocated to new call originations in the wireless coverage area. Such a predetermined first limit value may be stored in program data 210 and may be correlated with the specified vehicular traffic obstruction. Because a vehicular traffic obstruction may lead to atypically slow traffic flow, the first limit on extent of capacity allocated to new call originations that is associated with the vehicular traffic obstruction may be greater than the first limit, such as the default limit, imposed by RAN 200 at step 402. As a result, setting the first limit equal to the predetermined first limit value may involve increasing the first limit on extent of capacity allocated to new call originations in the wireless coverage area.

Like FIG. 4A, FIG. 4B is also a flowchart depicting functions that can be carried out by RAN 200 to adjust network capacity allocations based on vehicular traffic monitoring data. Method 450 shown in FIG. 4B may be carried out by a RAN, such as RAN 200, that radiates to define a wireless coverage area having an amount of capacity. Note that steps 452, 456, and 458, as shown in FIG. 4B, are similar to steps 402, 404, and 406, respectively, as shown in FIG. 4A and explained above. FIG. 4B also depicts additional steps 454 and 460, which may be carried out in addition to steps 452, 456, and 458. At step 454, RAN 200 may impose a second limit on extent of capacity allocated to handoffs into the wireless coverage area. Then, at step 460, based on the received vehicular traffic monitoring data, RAN 200 may adjust the second limit, so as to then impose a modified second limit on extent of capacity allocated to handoffs into the wireless coverage area.

In an embodiment of the method, steps 454 and 460 may be carried out along with (perhaps before, after, or at the same time as) steps 452 and 458. Thus, at step 454, RAN 200 may impose a second limit on extent of capacity allocated to handoffs into the wireless coverage area while RAN 200 imposes a first limit on extent of capacity allocated to new call originations in the wireless coverage area. Then, with respect to FIG. 4B for example, at step 460, upon RAN 200 making a determination that a vehicular traffic speed specified by received vehicular traffic monitoring data is below a speed threshold, RAN 200 may decrease the second limit, so as to then impose a decreased second limit on extent of capacity allocated to handoffs into the wireless coverage area. Alternatively, upon RAN 200 making a determination that the specified vehicular traffic speed is above a speed threshold, RAN 200 may increase the second limit, so as to then impose an increased second limit on extent of capacity allocated to handoffs into the wireless coverage area.

As another example, at step 460, RAN 200 may select a predetermined second limit value based on a vehicular traffic obstruction specified by the received vehicular traffic monitoring data. In some cases, the second limit value may be greater than the second limit imposed by RAN 200 at step 454, and so setting the second limit equal to the predetermined second limit value may involve increasing the second limit on extent of capacity allocated to handoffs into the wireless coverage area.

According to the present method, RAN 200 may adjust network capacity allocations multiple times. As one example, after first increasing and/or decreasing the extent of capacity allocated to new call originations and/or handoffs based on received vehicular traffic monitoring data, RAN 200 may then again increase and/or decrease the extent of capacity allocated to new call originations and/or handoffs based on later received vehicular traffic monitoring data. As another example, after a predetermined amount of time since adjusting the limit on extent of capacity allocated to new call originations, RAN 200 may automatically revert the limit to a default limit value, so as to then impose the default limit on extent of capacity allocated to new call originations in the wireless coverage area. Similarly, after a predetermined amount of time since adjusting the limit on extent of capacity allocated to handoffs, RAN 200 may automatically revert the limit to a default limit value, so as to then impose the default limit on extent of capacity allocated to handoffs into the wireless coverage area.

Example embodiments of the present invention have been described above. Those skilled in the art will appreciate, however, that many variations from the example embodiments are possible while remaining within the spirit and scope of the claims.

We claim:

1. A method of managing capacity in a radio access network (RAN), wherein the RAN comprises a base station that radiates to define a wireless coverage area having an amount of capacity for handling calls in the wireless coverage area, including new call originations in the wireless coverage area and handoffs of calls into the wireless coverage area, the method comprising:

the RAN imposing a first limit on extent of the capacity allocated to new call originations in the wireless coverage area, whereby, in response to the first limit being met or exceeded, the RAN would deny a further request for new call origination in the wireless coverage area;

the RAN receiving vehicular traffic monitoring data associated with vehicular traffic along one or more vehicular traffic routes; and based on the received vehicular traffic monitoring data, the RAN adjusting the first limit, so as to then impose a modified first limit on extent of the capacity allocated to new call originations in the wireless coverage area, whereby, in response to the modified first limit being met or exceeded, the RAN would deny a further request for new call origination in the wireless coverage area.

2. The method of claim 1, wherein the vehicular traffic monitoring data specifies at least one of (i) a vehicular traffic speed and (ii) a vehicular traffic obstruction.

3. The method of claim 2, wherein the vehicular traffic monitoring data specifies the vehicular traffic speed, the method further comprising:

the RAN making a determination that the specified vehicular traffic speed is below a speed threshold, wherein adjusting the first limit comprises increasing the first limit in response to the determination, so as to then impose an increased first limit on extent of the capacity allocated to new call originations in the wireless coverage area.

4. The method of claim 3, the method further comprising:

the RAN imposing a second limit on extent of the capacity allocated to handoffs into the wireless coverage area; and in response to the determination, the RAN decreasing the second limit, so as to then impose a decreased second limit on extent of the capacity allocated to handoffs into the wireless coverage area.

5. The method of claim 2, wherein the vehicular traffic monitoring data specifies the vehicular traffic speed, the method further comprising:

the RAN making a determination that the specified vehicular traffic speed is above a speed threshold, wherein adjusting the first limit comprises decreasing the first limit in response to the determination, so as to then impose a decreased first limit on extent of the capacity allocated to new call originations in the wireless coverage area.

6. The method of claim 5, the method further comprising:

the RAN imposing a second limit on extent of the capacity allocated to handoffs into the wireless coverage area; and in response to the determination, the RAN increasing the second limit, so as to then impose an increased second limit on extent of the capacity allocated to handoffs into the wireless coverage area.

7. The method of claim 2, wherein the vehicular traffic monitoring data specifies the vehicular traffic obstruction, the method further comprising:

before adjusting the first limit, the RAN selecting a predetermined first limit value based on the specified vehicular traffic obstruction, wherein the selected predetermined first limit value is greater than the first limit being imposed by the RAN, and wherein adjusting the first limit comprises setting the first limit equal to the selected predetermined first limit value, so as to then impose an increased first limit on extent of the capacity allocated to new call originations in the wireless coverage area.

8. The method of claim 7, the method further comprising:
the RAN imposing a second limit on extent of the capacity allocated to handoffs into the wireless coverage area;
the RAN selecting a predetermined second limit value based on the specified vehicular traffic obstruction, wherein the selected predetermined second limit value is less than the second limit being imposed by the RAN; and
the RAN setting the second limit equal to the selected predetermined second limit value, so as to then impose a decreased second limit on extent of the capacity allocated to handoffs into the wireless coverage area.

9. The method of claim 7, wherein the specified vehicular traffic obstruction is outside of the wireless coverage area.

10. The method of claim 1, the method further comprising:
after a predetermined amount of time since adjusting the first limit, the RAN automatically reverting the first limit to a default first limit value, so as to then impose the default first limit on extent of the capacity allocated to new call originations in the wireless coverage area.

11. The method of claim 1, wherein receiving the vehicular traffic monitoring data comprises receiving the vehicular traffic monitoring data from a vehicular traffic monitoring agency, wherein the vehicular traffic monitoring data is generated by the vehicular traffic monitoring agency based on at least one of (i) helicopter monitoring, (ii) road-side camera monitoring, and (iii) in-road sensors.

12. A radio access network, wherein the radio access network radiates to define a wireless coverage area having an amount of capacity for handling calls in the wireless coverage area, including new call originations in the wireless coverage area and handoffs of calls into the wireless coverage area, the radio access network comprising:
a wireless-communication interface;
a processor; and
data storage comprising program instructions executable by the processor for causing the radio access network to carry out functions including:
(i) imposing a first limit on extent of the capacity allocated to new call originations in the wireless coverage area, whereby, in response to the first limit being met or exceeded, the radio access network would deny a further request for new call origination in the wireless coverage area,
(ii) receiving vehicular traffic monitoring data associated with vehicular traffic along one or more vehicular traffic routes, and
(iii) based on the received vehicular traffic monitoring data, adjusting the first limit, so as to then impose a modified first limit on extent of the capacity allocated to new call originations in the wireless coverage area, whereby, in response to the modified first limit being met or exceeded, the radio access network would deny a further request for new call origination in the wireless coverage area.

13. The radio access network of claim 12, wherein the vehicular traffic monitoring data specifies at least one of (i) a vehicular traffic speed and (ii) a vehicular traffic obstruction.

14. The radio access network of claim 13, wherein the vehicular traffic monitoring data specifies the vehicular traffic speed, the data storage further comprising instructions for:
making a determination that the specified vehicular traffic speed is below a speed threshold,
wherein adjusting the first limit comprises increasing the first limit in response to the determination, so as to then impose an increased first limit on extent of the capacity allocated to new call originations in the wireless coverage area.

15. The radio access network of claim 14, the data storage further comprising instructions for:
imposing a second limit on extent of the capacity allocated to handoffs into the wireless coverage area; and
in response to the determination, decreasing the second limit, so as to then impose a decreased second limit on extent of the capacity allocated to handoffs into the wireless coverage area.

16. The radio access network of claim 13, wherein the vehicular traffic monitoring data specifies the vehicular traffic speed, the data storage further comprising instructions for:
making a determination that the specified vehicular traffic speed is above a speed threshold,
wherein adjusting the first limit comprises decreasing the first limit in response to the determination, so as to then impose a decreased first limit on extent of the capacity allocated to new call originations in the wireless coverage area.

17. The radio access network of claim 16, the data storage further comprising instructions for:
imposing a second limit on extent of the capacity allocated to handoffs into the wireless coverage area; and
in response to the determination, increasing the second limit, so as to then impose an increased second limit on extent of the capacity allocated to handoffs into the wireless coverage area.

18. The radio access network of claim 13, wherein the vehicular traffic monitoring data specifies the vehicular traffic obstruction, the data storage further comprising instructions for:
before adjusting the first limit, the RAN selecting a predetermined first limit value based on the specified vehicular traffic obstruction,
wherein the selected predetermined first limit value is greater than the first limit being imposed by the RAN, and wherein adjusting the first limit comprises setting the first limit equal to the selected predetermined first limit value, so as to then impose an increased first limit on extent of the capacity allocated to new call originations in the wireless coverage area.

19. The radio access network of claim 18, the data storage further comprising instructions for:
imposing a second limit on extent of the capacity allocated to handoffs into the wireless coverage area;
selecting a predetermined second limit value based on the specified vehicular traffic obstruction, wherein the selected predetermined second limit value is less than the second limit being imposed by the RAN; and
setting the second limit equal to the selected predetermined second limit value, so as to then impose a decreased second limit on extent of the capacity allocated to handoffs into the wireless coverage area.

20. The radio access network of claim 18, wherein the specified vehicular traffic obstruction is outside of the wireless coverage area.

21. The radio access network of claim 12, the data storage further comprising instructions for:
after a predetermined amount of time since adjusting the first limit, automatically reverting the first limit to a default first limit value, so as to then impose the default first limit on extent of the capacity allocated to new call originations in the wireless coverage area.

22. The radio access network of claim 12, wherein receiving the vehicular traffic monitoring data comprises receiving the vehicular traffic monitoring data from a vehicular traffic monitoring agency, wherein the vehicular traffic monitoring data is generated by the vehicular traffic monitoring agency based on at least one of (i) helicopter monitoring, (ii) roadside camera monitoring, and (iii) in-road sensors.

* * * * *